(12) United States Patent
Lackner et al.

(10) Patent No.: US 8,133,305 B2
(45) Date of Patent: Mar. 13, 2012

(54) REMOVAL OF CARBON DIOXIDE FROM AIR

(75) Inventors: Klaus S. Lackner, Dobbs Ferry, NY (US); Allen B. Wright, Tucson, AZ (US)

(73) Assignee: Kilimanjaro Energy, Inc., Waukesha, WI (US)

( * ) Notice: Subject to any disclaimer, the term of this patent is extended or adjusted under 35 U.S.C. 154(b) by 708 days.

(21) Appl. No.: 12/265,556

(22) Filed: Nov. 5, 2008

(65) Prior Publication Data

US 2009/0120288 A1 May 14, 2009

Related U.S. Application Data

(60) Provisional application No. 60/985,586, filed on Nov. 5, 2007.

(51) Int. Cl.
*B01D 53/04* (2006.01)
(52) U.S. Cl. .............. 95/139; 96/143; 96/153; 423/230; 423/231
(58) Field of Classification Search ................ 95/95, 96, 95/106, 114–116, 139; 96/143–146, 153; 423/230, 231; 422/122, 177, 178; 502/11, 502/414
See application file for complete search history.

(56) References Cited

U.S. PATENT DOCUMENTS

| | | | |
|---|---|---|---|
| 1,031,799 A | 7/1912 | MacKay | |
| 1,296,889 A | 3/1919 | White | 100/187 |
| 1,482,367 A | 1/1924 | Elledge | |
| 2,718,454 A | 9/1955 | Wylie | 423/229 |
| 2,796,145 A | 6/1957 | King | 96/262 |
| 3,024,207 A | 3/1962 | Shaw et al. | 521/28 |
| 3,063,195 A | 11/1962 | Ravich | 47/17 |
| 3,318,588 A | 5/1967 | Russell et al. | 261/153 |
| 3,330,750 A | 7/1967 | McRae et al. | 204/524 |
| 3,344,050 A | 9/1967 | Bertrand et al. | 205/555 |
| 3,554,691 A | 6/1968 | Kuo et al. | |
| 3,466,138 A | 9/1969 | Speigler et al. | 23/2 |
| 3,489,506 A | 1/1970 | Galstaun et al. | 423/233 |
| 3,498,026 A | 3/1970 | Messinger et al. | 55/73 |
| 3,594,989 A | 7/1971 | Bastiaans | 55/142 |
| 3,627,478 A | 12/1971 | Tepper | 423/230 |
| 3,627,703 A | 12/1971 | Kojima | 260/2.1 |
| 3,645,072 A | 2/1972 | Clapham | 55/387 |

(Continued)

FOREIGN PATENT DOCUMENTS

CA   1 212 522   10/1986

(Continued)

OTHER PUBLICATIONS

U.S. Appl. No. 11/683,824, filed Mar. 8, 2007, Wright et al.

(Continued)

*Primary Examiner* — Richard L Chiesa
(74) *Attorney, Agent, or Firm* — Hayes Soloway P.C.

(57) ABSTRACT

The present invention provides a method and apparatus for removing a contaminant, such as carbon dioxide, from a gas stream, such as ambient air. The contaminant is removed from the gas stream by a sorbent which may be regenerated using a humidity swing, a thermal swing, or a combination thereof. The sorbent may be a substrate having embedded positive ions and individually mobile negative ions wherein the positive ions are sufficiently spaced to prevent interactions between the negative ions. Where a thermal swing is used, heat may be conserved by employing a heat exchanger to transfer heat from the regenerated sorbent to an amount of sorbent that is loaded with the contaminant prior to regeneration.

16 Claims, 5 Drawing Sheets

U.S. PATENT DOCUMENTS

| | | |
|---|---|---|
| 3,691,109 A | 9/1972 | Larsen .................... 260/2.1 R |
| 3,710,778 A | 1/1973 | Cornelius ...................... 128/2 |
| 3,712,025 A | 1/1973 | Wallace .......................... 55/2 |
| 3,727,375 A | 4/1973 | Wallace .......................... 55/2 |
| 3,833,710 A | 9/1974 | Deschamps et al. ......... 423/573 |
| 3,865,924 A | 2/1975 | Gidaspow et al. ........... 423/230 |
| 3,876,565 A | 4/1975 | Takashima et al. ........... 260/2.1 |
| 3,876,738 A | 4/1975 | Marinaccio et al. ........... 264/41 |
| 3,907,967 A | 9/1975 | Filss .............................. 423/210 |
| 3,915,822 A | 10/1975 | Veltman ...................... 204/151 |
| 3,948,627 A | 4/1976 | Schwarz et al. ............... 55/230 |
| 3,981,698 A | 9/1976 | Leppard .......................... 55/31 |
| 4,012,206 A | 3/1977 | Macriss et al. ................... 55/34 |
| 4,047,894 A | 9/1977 | Kuhl ............................... 23/284 |
| 4,167,551 A | 9/1979 | Tamura et al. ................ 521/27 |
| 4,197,421 A | 4/1980 | Steinberg ...................... 585/733 |
| 4,238,305 A | 12/1980 | Gancy et al. ................. 204/180 |
| 4,239,515 A | 12/1980 | Yanagioka et al. ............. 55/223 |
| 4,246,241 A | 1/1981 | Mathur et al. ................ 423/179 |
| 4,296,050 A | 10/1981 | Meier ........................ 261/112.2 |
| 4,340,480 A | 7/1982 | Pall et al. .................... 210/490 |
| 4,436,707 A | 3/1984 | Karwat ........................ 423/226 |
| 4,475,448 A | 10/1984 | Shoaf et al. .................. 99/323.1 |
| 4,497,641 A | 2/1985 | Brown, Jr. et al. .............. 55/240 |
| 4,511,375 A | 4/1985 | BeVier ............................. 55/28 |
| 4,528,248 A | 7/1985 | Galbraith ......................... 429/8 |
| 4,566,221 A | 1/1986 | Kossin ........................ 47/41.12 |
| 4,592,817 A | 6/1986 | Chlanda et al. .............. 204/534 |
| 4,594,081 A | 6/1986 | Kroll et al. ..................... 96/235 |
| 4,608,140 A | 8/1986 | Goldstein ................... 435/173.9 |
| 4,678,648 A | 7/1987 | Wynn ........................... 423/230 |
| 4,711,645 A | 12/1987 | Kumar ............................. 55/26 |
| 4,729,883 A | 3/1988 | Lam et al. ................... 423/228 |
| 4,770,777 A | 9/1988 | Steadly et al. ................ 210/490 |
| 4,804,522 A | 2/1989 | Hass ............................. 423/235 |
| 4,810,266 A | 3/1989 | Zinnen et al. .................. 55/68 |
| 4,861,360 A | 8/1989 | Apffel ............................. 62/17 |
| 4,869,894 A | 9/1989 | Wang et al. .................. 423/650 |
| 4,899,544 A | 2/1990 | Boyd ............................. 60/618 |
| 4,906,263 A | 3/1990 | Von Blucher et al. .......... 96/135 |
| 4,941,898 A | 7/1990 | Kimura ........................ 96/282 |
| 5,070,664 A | 12/1991 | Groh et al. .................... 52/177 |
| 5,180,750 A | 1/1993 | Sugaya et al. ................ 521/32 |
| 5,215,662 A | 6/1993 | Johnson et al. .......... 210/500.38 |
| 5,277,915 A | 1/1994 | Provonchee et al. .......... 424/485 |
| 5,281,254 A | 1/1994 | Birbara et al. ................... 95/44 |
| 5,308,466 A | 5/1994 | Ganzi et al. .................. 204/151 |
| 5,316,637 A | 5/1994 | Ganzi et al. ................. 204/182.4 |
| 5,318,758 A | 6/1994 | Fujii et al. .................... 423/228 |
| 5,344,627 A | 9/1994 | Fujii et al. .................... 423/220 |
| 5,385,610 A | 1/1995 | Deerer et al. ................. 118/241 |
| 5,389,257 A | 2/1995 | Todd et al. .................... 210/602 |
| 5,414,957 A | 5/1995 | Kenney ...................... 47/12.12 |
| 5,454,189 A | 10/1995 | Graham et al. .............. 47/41.12 |
| 5,525,237 A | 6/1996 | Birbara et al. ................ 210/670 |
| 5,535,989 A | 7/1996 | Sen ............................ 261/112.1 |
| 5,658,372 A | 8/1997 | Gadkaree .................... 95/116 |
| 5,682,709 A | 11/1997 | Erickson .................... 47/58.1 R |
| 5,711,770 A | 1/1998 | Malina ...................... 48/197 R |
| 5,756,207 A | 5/1998 | Clough et al. ................ 428/375 |
| 5,779,767 A | 7/1998 | Golden et al. .................. 95/96 |
| 5,788,826 A | 8/1998 | Nyberg ........................ 204/536 |
| 5,797,979 A | 8/1998 | Quinn .............................. 95/97 |
| 5,876,488 A | 3/1999 | Birbara et al. ................. 95/139 |
| 5,887,547 A | 3/1999 | Caveny et al. ............... 119/174 |
| 5,914,455 A | 6/1999 | Jain et al. ...................... 95/96 |
| 5,917,136 A | 6/1999 | Gaffney et al. ................. 95/98 |
| 5,934,379 A | 8/1999 | Ostlyngen et al. ............. 169/46 |
| 5,955,043 A | 9/1999 | Neuman et al. ............. 423/206.2 |
| 5,972,080 A | 10/1999 | Nagata ............................ 96/13 |
| 5,980,611 A | 11/1999 | Kumar et al. .................. 95/101 |
| 6,004,381 A | 12/1999 | Rohrbach et al. .............. 95/211 |
| 6,027,552 A | 2/2000 | Ruck et al. |
| 6,083,740 A | 7/2000 | Kodo et al. ................... 435/266 |
| 6,117,404 A | 9/2000 | Mimura et al. ............... 423/228 |
| 6,136,075 A | 10/2000 | Bragg et al. .................... 96/135 |
| 6,180,012 B1 | 1/2001 | Rongved ...................... 210/717 |
| 6,221,225 B1 | 4/2001 | Mani ............................ 204/523 |
| 6,228,145 B1 | 5/2001 | Falk-Pedersen et al. ......... 95/44 |
| 6,237,284 B1 | 5/2001 | Erickson .................... 47/58.1 R |
| 6,279,576 B1 | 8/2001 | Lambert .................. 128/205.28 |
| 6,306,803 B1 | 10/2001 | Tazaki .......................... 508/539 |
| 6,316,668 B1 | 11/2001 | King et al. |
| 6,334,886 B1 | 1/2002 | Barnes et al. |
| 6,364,938 B1 | 4/2002 | Birbara et al. ................. 95/139 |
| 6,402,819 B1 | 6/2002 | De Ruiter et al. ............... 96/153 |
| 6,503,957 B1 | 1/2003 | Bernatowicz et al. .......... 521/27 |
| 6,547,854 B1 | 4/2003 | Gray et al. ..................... 95/139 |
| 6,582,498 B1 | 6/2003 | Sass et al. ..................... 95/211 |
| 6,617,014 B1 | 9/2003 | Thomson .................... 428/304.4 |
| 6,632,848 B2 | 10/2003 | Sugaya |
| 6,645,272 B2 | 11/2003 | Lemaire et al. ................ 95/174 |
| 6,716,888 B2 | 4/2004 | Bernatowicz et al. .......... 521/27 |
| 6,755,892 B2 | 6/2004 | Nalette et al. ................. 95/139 |
| 6,863,713 B1 * | 3/2005 | Ghosal et al. .................. 95/117 |
| 6,890,497 B2 | 5/2005 | Rau et al. ...................... 423/220 |
| 6,908,497 B1 | 6/2005 | Sirwardane ..................... 95/136 |
| 6,969,466 B1 | 11/2005 | Starner ......................... 210/663 |
| 7,067,456 B2 | 6/2006 | Fan et al. ....................... 502/400 |
| 7,132,090 B2 | 11/2006 | Dziedzic et al. ................ 423/230 |
| 7,270,796 B2 | 9/2007 | Kemp et al. .................... 423/549 |
| 7,343,341 B2 | 3/2008 | Sandor et al. ................... 705/37 |
| 7,364,608 B2 | 4/2008 | Tanahashi et al. .............. 96/108 |
| 7,384,621 B2 | 6/2008 | Stevens et al. ................ 423/650 |
| 7,415,418 B2 | 8/2008 | Zimmerman .................... 705/1 |
| 7,420,004 B2 | 9/2008 | Hardy et al. .................. 518/704 |
| 7,655,069 B2 | 2/2010 | Wright et al. .................... 95/92 |
| 7,708,806 B2 * | 5/2010 | Wright et al. .................. 95/139 |
| 7,776,296 B2 | 8/2010 | Sarlis ............................ 423/229 |
| 7,993,432 B2 | 8/2011 | Wright et al. .................. 95/139 |
| 2001/0004895 A1 | 6/2001 | Preiss ....................... 128/205.28 |
| 2001/0009124 A1 | 7/2001 | Suzuki et al. ................... 95/113 |
| 2001/0022952 A1 | 9/2001 | Rau et al. ...................... 422/169 |
| 2002/0083833 A1 | 7/2002 | Nalette et al. ................. 95/139 |
| 2002/0102674 A1 | 8/2002 | Anderson ..................... 435/174 |
| 2002/0178925 A1 | 12/2002 | Mimura et al. ................ 96/299 |
| 2003/0022948 A1 | 1/2003 | Seiki et al. .................... 518/704 |
| 2003/0145726 A1 | 8/2003 | Gueret et al. .................... 95/96 |
| 2003/0167692 A1 | 9/2003 | Jewell et al. ................... 48/197 |
| 2003/0205692 A1 | 11/2003 | Fleming et al. ................ 252/70 |
| 2003/0220188 A1 | 11/2003 | Marand et al. ................. 502/60 |
| 2004/0031424 A1 | 2/2004 | Pope ............................ 110/230 |
| 2004/0069144 A1 | 4/2004 | Wegeng et al. ................ 95/106 |
| 2004/0103831 A1 | 6/2004 | Pope ............................ 110/341 |
| 2004/0134353 A1 | 7/2004 | Gillingham et al. ............. 95/273 |
| 2004/0195115 A1 | 10/2004 | Colombo .................... 206/204 |
| 2004/0213705 A1 | 10/2004 | Blencoe et al. ............... 422/129 |
| 2004/0219090 A1 | 11/2004 | Dziedzic et al. ............. 423/437.1 |
| 2005/0011770 A1 | 1/2005 | Katsuyoshi et al. .......... 205/742 |
| 2005/0063956 A1 | 3/2005 | Bernklau et al. ............. 424/93.4 |
| 2005/0092176 A1 | 5/2005 | Ding et al. ....................... 95/90 |
| 2005/0095486 A1 | 5/2005 | Hamamoto et al. ............ 429/33 |
| 2005/0204915 A1 | 9/2005 | Sammons et al. ................ 95/45 |
| 2005/0252215 A1 | 11/2005 | Beaumont ....................... 60/753 |
| 2005/0269094 A1 | 12/2005 | Harris |
| 2005/0279095 A1 | 12/2005 | Goldman ....................... 60/641.8 |
| 2006/0013963 A1 | 1/2006 | Thomson ..................... 427/487 |
| 2006/0042209 A1 | 3/2006 | Dallas et al. .................... 55/524 |
| 2006/0051274 A1 | 3/2006 | Wright et al. ................. 423/220 |
| 2006/0186562 A1 | 8/2006 | Wright et al. .................... 261/94 |
| 2006/0249020 A1 | 11/2006 | Tonkovich et al. ............. 95/115 |
| 2006/0289003 A1 | 12/2006 | Lackner et al. ............ 128/200.24 |
| 2007/0004023 A1 | 1/2007 | Trachtenberg ................ 435/266 |
| 2007/0089605 A1 | 4/2007 | Lampinen ...................... 95/139 |
| 2007/0149398 A1 | 6/2007 | Jones et al. .................... 502/402 |
| 2007/0187247 A1 | 8/2007 | Lackner et al. ................ 204/518 |
| 2007/0199448 A1 | 8/2007 | Yates et al. ..................... 95/139 |
| 2007/0217982 A1 | 9/2007 | Wright et al. .................. 423/230 |
| 2008/0008793 A1 | 1/2008 | Forsyth et al. ................. 426/118 |
| 2008/0025893 A1 | 1/2008 | Asprion et al. ................ 423/228 |
| 2008/0031801 A1 | 2/2008 | Lackner et al. ................ 423/438 |
| 2008/0087165 A1 | 4/2008 | Wright et al. .................... 95/51 |
| 2008/0293976 A1 | 11/2008 | Olah et al. ...................... 95/139 |
| 2009/0120288 A1 | 5/2009 | Lackner et al. .................. 95/68 |
| 2009/0232861 A1 | 9/2009 | Wright et al. .................. 424/405 |

| | | | | |
|---|---|---|---|---|
| 2009/0294366 A1 | 12/2009 | Wright et al. | | 210/683 |
| 2010/0105126 A1* | 4/2010 | Wright et al. | | 435/257.1 |
| 2010/0319537 A1 | 12/2010 | Eisenberger et al. | | 95/139 |

FOREIGN PATENT DOCUMENTS

| | | | | |
|---|---|---|---|---|
| CA | 1 236 877 | 5/1988 | | |
| DE | 4 130 837 | 4/1992 | | |
| DE | 195 21 678 | 6/1995 | | |
| DE | 19521678 | 6/1995 | | |
| DE | 195 21 678 | 12/1996 | | |
| DE | 197 27 295 | 1/1999 | | |
| DE | 198 30 470 | 11/1999 | | |
| DE | 20001385 | 1/2000 | | |
| DE | 200 01 385 | 8/2000 | | |
| EP | 0020055 | 5/1980 | | |
| EP | 0 020 055 | 12/1980 | | |
| EP | 0111911 | 6/1984 | | 95/139 |
| EP | 0111911 A1 * | 6/1984 | | 95/139 |
| EP | 0 254 137 | 1/1988 | | |
| EP | 0254137 | 1/1988 | | |
| EP | 0 585 898 | 9/1994 | | |
| FR | 2.029.424 | 10/1970 | | |
| GB | 1 031 799 | 2/1963 | | |
| GB | 1 004 046 | 9/1965 | | |
| GB | 1 031 799 | 6/1966 | | |
| GB | 1109439 | 4/1968 | | |
| GB | 1 204 781 | 9/1970 | | |
| GB | 1296889 | 11/1972 | | |
| GB | 1 520 110 | 10/1974 | | |
| JP | 58-122022 | 7/1983 | | |
| JP | 61 72 035 | 4/1986 | | |
| JP | 61 072 035 | 4/1986 | | |
| JP | 61-254221 | 11/1986 | | |
| JP | 61-280217 | 12/1986 | | |
| JP | 63 12323 | 1/1988 | | |
| JP | 63 12324 | 1/1988 | | |
| JP | 63-016032 | 1/1988 | | |
| JP | 63012323 | 1/1988 | | |
| JP | 63012324 | 1/1988 | | |
| JP | 63-69525 | 3/1988 | | |
| JP | 63-69527 | 3/1988 | | |
| JP | 63-695525 | 3/1988 | | |
| JP | 1-208310 | 8/1989 | | |
| JP | 1-305809 | 12/1989 | | |
| JP | 03-245811 | 1/1991 | | |
| JP | 04-200720 | 7/1992 | | |
| JP | 06-253682 | 9/1994 | | |
| JP | 2000-107895 | 4/2000 | | |
| JP | 2004-261757 | 9/2004 | | |
| JP | 2006-340683 | 12/2006 | | |
| JP | 2007-190529 | 8/2007 | | |
| RU | 511963 | 6/1976 | | |
| RU | 715120 | 2/1980 | | |
| RU | 2097115 | 11/1997 | | |
| SD | 1 828 406 | 7/1993 | | |
| SU | 1 828 406 | 7/1993 | | |
| WO | WO 98/16296 | 4/1998 | | |
| WO | WO 98/17388 | 4/1998 | | |
| WO | WO 98/22173 A | 5/1998 | | |
| WO | WO 00/050154 | 8/2000 | | |
| WO | WO 00/50154 | 8/2000 | | |
| WO | WO 00/76633 | 12/2000 | | |
| WO | WO 01/21269 | 3/2001 | | |
| WO | WO 2005/108297 | 11/2005 | | |
| WO | WO 2006/009600 | 1/2006 | | |
| WO | 2006/036396 | 4/2006 | | |
| WO | WO 2006/036396 | 4/2006 | | |
| WO | WO 2006/084008 | 8/2006 | | |
| WO | WO 2007/016271 | 2/2007 | | |
| WO | WO 2007/016274 | 2/2007 | | |
| WO | WO 2007/114991 | 10/2007 | | |
| WO | WO 2008/042919 | 4/2008 | | |
| WO | WO 2008/131132 | 4/2008 | | |
| WO | WO 2008/061210 | 5/2008 | | |
| WO | WO 2009/149292 | 12/2009 | | |

OTHER PUBLICATIONS

Lackner et al., "Free-Market Approaches to Controlling Carbon Dioxide Emissions to the Atmosphere: A Discussion of the scientific basis", Los Alamos National Laboratory (Lackner & Ziock) & Harvard University (Wilson), pp. 1-16.
Lackner, Klaus S., "Can Fossil Carbon Fuel the $21^{st}$ Century?", International Geology Review, vol. 44, 2002, pp. 1122-1133.
"Extraction of Carbon Dioxide from the Atmosphere Through Engineered Chemical Sinkage", Dubey et al., Fuel Chemistry Division Preprints, 2001, pp. 1-4.
"Extraction CO2 from the Air", Lackner presentation, 12 pgs.
"Carbon Dioxide Extraction from Air: Is it an Option?", Lackner et al., Proceedings of the $24^{th}$ Annual Technical Conference on Coal Utilization and Fuel Systems, Mar. 8-11, 1999, pp. 885-896.
"Compensation of Atmospheric CO2 Buildup Through Engineered Chemical Sinkage", Elliott et al., pp. 1-8.
"Capturing Carbon Dioxide From Air", Lackner et al., pp. 1-15.
"The Case for Carbon Dioxide Extraction Front Air", Lackner et al., Sourcebook, Sep. 1999, vol. 57, No. 9, pp. 6-10.
"An Industrial Sized Unit" Drawing and specification.
"Carbon Dioxide Extraction from Air", Lackner et al., Arguments pp. 1-5.
"New Findings May Redefine Renewable Energy Debate", Bituin, found at http://www.dailycal.org/article.php?id=8559.
"Imagine No Restrictions on Fossil-Fuel Usage And No Global Warming!", Rickman, found at http://www.lanl.gov/news/releases/archive/02-028.shtml.
"In the Lab", Jason Hensel, found at www.eponline.com.
"Americans Believe in Global Warming . . . and Psychic Powers, Astrology, and UFO's", S. Fred Singer, found at http://heartland.org/.
"Science for Sustainability: From Capturing Carbon Dioxide From Air to Environmental Impact of a Hydrogen Economy", Dubey, found at http://www.mbari.org/seminars/2003/spring2003/apr2dubey.html.
"New Solutions to Oil Problems", Whitley Strieber's Unknown Country, 2002, found at http://www.unknowncountry.com/news/print.phtml?id-1467.
"Chemical Extraction of Carbon Dioxide from Air to Sustain Fossil Energy by Avoiding Climate Change", Dubey et al., $2^{nd}$ Annual Conference on Carbon Sequestration, 2003.
"Researchers Explore Extracting CO2 Directly From Air" found at http://www.earthvision.net/ColdFusion/News_Pagel.cfm?NewsID=20309.
Abstracts of Eos. Trans. AGU, 83 (19), Spring Meeting 2002, 3 pgs.
Abstracts of Eos. Trans. AGU, 83 (47), Fall Meeting 2002, 3 pgs.
"Written Public Comments on the Strategic Plan for the U.S. Climate Change Science Program, General Comments", 2003, pp. 1-160.
Environment & Climate News, vol, 5, No. 7, Aug. 2002, 20 pgs.
"Carbon Sequestration Could Be Employed Today to Help Alleviate Greenhouse Emissions" found at http://ww.earthinstitute.columbia.edu/news/2003/story06-25-03b.html.
"CO2 Capture from the Air: Technology Assessment and Implications for Climate Policy", Keith et al., pp. 1-6.
Resume of David Keith, Spring 2005. 8 pgs. "Climate Strategy With CO2 Capture From the Air", Keith et al., found at http://ideas.repec.org/p/hal.papers/halshs-00003926_vI.html.
"Information About David Keith" found at http://ideas.respec.org/e/pke74.html.
"Climate Strategy with CO2 Capture from the Air" Keith et al., Mar. 31, 2005, pp. 1-43.
Abstracts of Eos. Trans. AGU, 82 (47), Fall Meeting 2001, 3 pgs.
"The Carrot or the Stick: How to Build a Technology-Friendly Climate Policy in Canada" Presentation by David Keith, Climate Change Central Apr. 15, 2005, pp. 1-32.
Information on David Keith found at http://www.ucalgary.ca/~keith/.
J. Balster et al., "Multi-Layer Spacer Geometries With Improved Mass Transport", May 16, 2006, pp. 351-361.
T. Sata, "Monovalent Cation Permeelective Exchange Membrane", Apr. 15, 1972, pp. 980-982.
Toshikatsu Sata, "Modification of Properties of Ion-Exchange Membranes IV. Change of Transport Properties of Cation-Exchange Membranes by Various Polyelectrolytes", 1978, pp. 1063-1080.
Toshikatsu Sata, Yukio Mizutani, "Modification of Properties of Ion Exchange Membranes. VI. Electrodialytic Transport Properties of Cation Exchange Membranes with a Electrodesposition Layer of Cationic Polyelectrolytes", 1979, pp. 1199-1213.
Toshikatsu Sata, "Modification of Properties of Ion Exchange Membranes, VII, Relative Transport Number between Various Cations of Cation Exchange Membrane Having Cationic Polyelectrolyte Layer and Mechanism of Selective Permeation of Particular Cations", 1979, pp. 2071-2085.
"Capturing Carbon Dioxide From Air", Lackner et al., pp. 1-15.
*"Carbon Sequestration Could Be Employed Today to Help Alleviate Greenhouse Emissions"* found at http://www.earthinstitute.columbia.edu/news/2003/story06-25-03b.html.
"Climate Strategy with $CO_2$ Capture from the Air" Keith et al., Mar. 31, 2005, pp. 1-43.
"$CO_2$ Capture From the Air: Technology Assessment and Implications for Climate Policy", Keith et al., pp. 1-6.
"Compensation of Atmospheric $CO_2$ Buildup Through Engineered Chemical Sinkage", Elliot et al., pp. 1-8.
"Extraction of Carbon Dioxide from the Atmosphere Through Engineered Chemical Sinkage", Dubey et al., Fuel Chemistry Division Preprints, 2001, pp. 1-4.
"$CO_2$ Extraction from Air", Lackner et al.
"Imagine No Restriction on Fossil-Fuel Usage and No Global Warming!", Rickman, found at http://www.lanl.gov/news/releases/archive/02-028.shtml.
"In the Lab", Jason Hensel, found at www.eponline.com/articles/53584.
*"Researchers Explore Extracting CO2 Directly From Air"* found at http://www.earthvision.net/ColdFusion/News_Page1.cfm?NewsID=20309.
*"The Carrot or the Stick: How to Build a Technology-Friendly Climate Policy in Canada"* Presentation by David Keith, Climate Change Central Apr. 15, 2005, pp. 1-32.
"The Case for Carbon Dioxide Extraction From Air," ($CO_2$ Extraction From Air, A White Paper from Los Alamos National Labs) Lackner et al., Sourcebook, Sep. 1999, vol. 57, No. 9, pp. 6-10.
*"Written Public Comments on the Strategic Plan for the U.S. Climate Change Science Program, General Comments"*, 2003, pp. 1-160.
Information on David Keith found at http://www.ucalgary.ca/~keith/.
J. Balster et al., "Multi-Layer Spacer Geometries With Improved Mass Transport", May 16, 2006, pp. 351-361.
Lackner et al., "Free-Market Approaches to Controlling Carbon Dioxide Emissions to the Atmosphere: A Discussion of the scientific basis", Los Alamos National Laboratory (Lackner & Ziock) & Harvard University (Wilson), pp. 1-16.
Lackner, Klaus S., "Can Fossil Carbon Fuel the $21^{th}$ Century?", International Geology Review, vol. 44, 2002, pp. 1122-1133.
Official Action issued in Applicants' counterpart Chinese Patent Application Serial No. 200680030297.
Russian Official Action+Translation, dated Feb. 11, 2010, Appln. No. 2007132880/15 (05886), (13 pgs).
T.Sata, "Monovalent Cation Permselective Exchange Membrane", Apr. 15, 1972, pp. 980-982.
Toshikatsu Sata, "Modification of Properties of Ion Exchange Membranes. IV. Change of Transport Properties of Cation-Exchange Membranes by Various Polyelectrolytes", 1978, pp. 1063-1080.
Toshikatsu, Yukio Mizutani, "Modification of Properties of Ion Exchange Membranes. VI. Electrodialytic Transport Properties of Cation Exchange Membranes with a Electrodeposition Layer of Cationic Polyelectrolytes", 1979, pp. 1199-1213.
Toshikatsu, Yukio Mizutani, "Modification of Properties of Ion Exchange Membranes. VII. Relative Transport Number between Various Cations of Cation Exchange Membrane Having Cationic Polyelectrolyte Layer and Mechanism of Selective Permeation of Particular Cations", 1979, pp. 2071-2085.
Sun et al., "$CO_2$ sorption in activated carbon in the presence of water", dated Feb. 9, 2007, Science Direct, Chemical Physics Letterse 437 (2000) (abstract enclosed).
Liang, "Carbon Dioxide Capture From Flue Gas Using Regenerable Sodium-Based Sorbents", dated Aug. 1, 2003, Department of Chemical Engineering Thesis, (137 pgs).
Dow Chemical Company, Dowex Type 1 Strong Base Anion Resin, 1998, http://www.inaqua.de/Prod/ion/pdf_en/313_UPCORE_Mono_A625.pdf, p. 1.

Official Action dated Mar. 15, 2010, U.S. Appl. No. 11/683,824, 10 pgs.
Official Action received in related Chinese Patent Application Serial No. 200680030297.
Official Action received in related Australian Patent Application Serial No. 2006210619.
Canadian Official Action dated Jun. 21, 2011, Appln. No. 2,577,685.
Chinese Official Action dated Apr. 28, 2011 Appln. No. 200780042511.8.
Chinese Official Action dated Jun. 13, 2011, Appln. No. 200780008015.0.
Huang, Houping and Chang, Shih-Ger "Method to Regenerate Ammonia for the Capture of Carbon Dioxide" Energy and Fuels 2002, 16, 904-910.
International Search Report and Written Opinion dated Nov. 24, 2010 GCC/P/2007/9020.
Israel Official Action, Application Serial No. 25585/09, dated Jun. 30, 2011.
Japanese Official Action, Application Serial No. 2008-524154, dated May 31, 2011, 3 pgs.
Office Action dated Aug. 3, 2011 in U.S. Appl. No. 12/903,962.
Office Action dated Aug. 1, 2011 in U.S. Appl. No. 12/903,974.
Official Action dated Jul. 1, 2011 in U.S. Appl. No. 13/102,915.
Official Action issued in Applicants' counterpart European Patent Application Serial No. 07 758 183.3—1213 dated Jul. 4, 2011.
Official Action issued in Applicants' counterpart European Patent Application Serial No. 07 853 742.0—1213 dated Jul. 27, 2011.
Official Action issued in Applicants' counterpart European Patent Application Serial No. 08 746 144.8-2113 / 2139584 dated May 9, 2011.
Official Action issued in Applicants' counterpart Russian Patent Application Serial No. 2009116621/05 (022802) dated Jun. 1, 2011.
Official Action received in Applicants' related Australian Patent Application Serial No. 2010241388 dated Jul. 7, 2011.
Official Action received in Applicants' related Australian Patent Application Serial No. 2007319211 dated Jun. 17, 2011.
Official Action received in Applicants' related Australian Patent Application Serial No. 2007233275 dated Jun. 1, 2011.
Official Action received in Applicants' related Mexican Patent Application Serial No. MX/a/2007/009081, dated Jul. 18, 2011.
Official Action received in Applicants' related New Zealand Patent Application Serial No. 575870 dated Jun. 27, 2011.
Official Action for U.S. Appl. No. 11/209,962, dated Sep. 11, 2009, (16 pgs).
U.S. Appl. No. 12/596,642, filed Oct. 19, 2009, Wright et al.
Abstracts of Eos. Trans. AGU, 83 (47), Fall Meeting 2002; pp. 3.
Balster et al., "Multi-Layer Spacer Geometries With Improved Mass Transport", 2006; pp. 351-361.
Bituin, "New Findings May Redefine Renewable Energy Debate", found at http://www.dailyeal.org/article.php?id=8559.
Chinese Official Action dated May 5, 2010 and Jan. 20, 2011, Appln. No. 200680030297.X.
Chinese Official Action dated Dec. 3, 2010, Appln. No. 200780008015.
Choi et al. "A new preparation for cation-exchange membrane using monomer sorption into reinforcing materials" Desalination 146. Mar. 22, 2002.
Choi et al. "Characterization of LDPE/polystyrene cation exchange membranes prepared by monomer sorption and UV radiation polymerization" Journal of Membrane Science 223 (2003) 201-215. Jul. 13, 2003.
Choi et al. "Preparation and characterization of LDPE/polyvinvylbenzyl trimethyl ammonium salts anion-exchange membrane" Journal of Membrane Science 221 (2003) 219-231. Jun. 13, 2003.
Cuiming et al. "Fundamental Studies of a New Hybrid (Inorganic-Organic) Positively Charged Membrane: Membrane Preparation and Characterizations" Journal of Membrane Science 216 (2003) 269-278 Feb. 16, 2003.
Dubey et al., "Chemical Extraction of Carbon Dioxide from Air to Sustain Fossil Energy by Avoiding Climate Change", 2nd Annual Conference on Carbon Sequestration, 2003.

Dubey et al., "Extraction of Carbon Dioxide from the Atmosphere Through Engineered Chemical Sinkage", Fuel Chemistry Division Preprints, 2001; pp. 1-4.
Dubey, "Science for Sustainability: From Capturing Carbon Dioxide From Air to Environmental Impact of a Hydrogen Economy", found at http://www.mbari.org/seminars/2003/spring2003/apr2_dubey.html.
Elliot et al., "Compensation of Atmospheric CO2 Buildup Through Engineered Chemical Sinkage", pp. 1-8.
Environment & Climate News, 2002; vol. 5, No. 7.
Fuertes et al. "Carbon Composite Membranes from Matrimid and Kapton Polymides for Gas Separation" Microporous and Mesoporous Materials 33 (1999) 115-125 Jun. 16, 1999.
Hashimoto et al., "Global CO2 recycling", (1996) Zairyo to Kankyo/Corrosion Engineering, 45 (10), pp. 614-620 (Abstract only).
Hensel, "In the Lab", found at www.eponline.com/articles/53584.
"Information About: David Keith" found at http://ideas.respec.org/e/pke74.html, http://www.ucalgary.ca/~keith/.
International Preliminary Report on Patentability, Dated Jan. 24, 2008 PCT/US2006/003646.
International Preliminary Report on Patentability, mailed Jun. 10, 2010 PCT/US2007/063607.
International Preliminary Report on Patentability, Aug. 11, 2009 PCT/US2009/053461.
International Preliminary Report on Patentability, Aug. 24, 2009 PCT/US2009/054795.
International Preliminary Report on Patentability, mailed Feb. 24, 2011, PCT/US09/53461.
International Preliminary Report on Patentability, Nov. 15, 2007 PCT/US2007/084880.
International Preliminary Report on Patentability, Jan. 27, 2009, PCT/US2007/84237.
International Preliminary Report on Patentability, Oct. 20, 2009, PCT/US2008/60672.
International Preliminary Report on Patentability, May 11, 2010, PCT/US2008/82505.
International Preliminary Report on Patentability, Dec. 6, 2010, PCT/US2009/46306.
International Preliminary Report on Patentability, Jun. 1, 2010, PCT/US2007/80229.
International Preliminary Report on Patentability, Jan. 29, 2008, PCT/US2006/029238.
International Search report and Written Opinion Feb. 2, 2006 PCT/US2006/003646.
International Search report and Written Opinion Jul. 28, 2006 PCT/US2006/029238.
International Search report and Written Opinion mailed Feb. 25, 2008 PCT/US2007/63607.
International Search report and. Written Opinion mailed Mar. 8, 2008 PCT/US2007/80229.
International Search report and Written Opinion mailed Apr. 23, 2008 PCT/US2007/84880.
International Search report and Written Opinion mailed Sep. 15, 2008 PCT/US2008/60672.
International Search report and Written Opinion mailed. Dec. 24, 2008 PCT/US2008/82505.
International Search report and Written Opinion mailed Sep. 25, 2009 PCT/US2009/53461.
International Search report and Written Opinion mailed Dec. 9, 2009 PCT/US2009/54795.
International Search report and Written Opinion mailed Jan. 27, 2009 PCT/US2008/84237.
International Search report and Written Opinion mailed Sep. 3, 2009 PCT/US2009/46306.
International Search Report and Written Opinion dated Oct. 4, 2006 PCT/US05/29584.
International Preliminary Report on Patentability dated Feb. 20, 2007 PCT/US05/29584.
Japanese Official Action, Application Serial No. 2009-531567, dated Feb. 7, 2011, 4 pgs.
Japanese Official Action, Application Serial No. 2008-524154, dated Feb. 16, 2011, 4 pgs.

Keith et al., "Climate Strategy with CO2 Capture from the Air" 2005; pp. 1-43.
Keith et al., "CO2 Capture From the Air: Technology Assessment and Implications for Climate Policy", pp. 1-6.
Keith et al., Resume of David Keith, Spring 2005, 8 pgs. "Climate Strategy with CO2 Capture From the Air", found at http://ideas.repec.org/p/hal/papers/halshs-00003926_v1.html.
Lackner et al., "Capturing Carbon Dioxide From Air", pp. 1-15.
Lackner et al., "Carbon Dioxide Extraction from Air?", Arguments pp. 1-5.
Lackner et al., "Carbon Dioxide Extraction from Air: Is It an Option?", Proceedings of the 24th Annual Technical Conference on Coal Utilization and Fuel Systems, 1999; pp. 885-896.
Lackner et al., "CO2 Extraction from Air" A White Paper from Los Alamos National Labs, The Reddy Corporation International, Sourcebook, Sep. 1999 (12 Pgs).
Lackner et al., "The Case for Carbon Dioxide Extraction From Air," Sourcebook, Sep. 1999; vol. 57, No. 9, pp. 6-10.
Lackner K.S., Grimes P., Ziock H-J, 'Capturing Carbon Dioxide from Air' First National Conference on Carbon Sequestration (Washington) 2001.
"Extraction CO2 from the Air", Lackner presentation, 12 pages.
Liu et al., "Composite Membranes from Photochemical Synthesis of Ultrathin Polymer Films" Nature vol. 352 Jul. 4, 1991.
Mexican Official Action, Dated Jan. 24, 2011, Serial No. Mx/a/2007/002019.
Mexican Official Action, Dated Feb. 2, 2011, Serial No. Mx/a/2008/011464.
Mizutani, Y "Structure of Ion Exchange Membranes" Journal of Membrane Science 49 (1990) 121-144 Aug. 21, 1989.
Murdoch et al., "Sabatier Methanation Reactor for Space Exploration", (2005) A Collection of Technical Papers—$1^{st}$ Space Exploration Conference: Continuing the Voyage of Discovery, 2, pp. 981-987 (Abstract only).
Office Action dated Sep. 11, 2009 in U.S. Appl. No. 11/209,962.
Office Action dated Feb. 23, 2010 in U.S. Appl. No. 11/209,962.
Office Action dated Jun. 9, 2010 in U.S. Appl. No. 11/209,962.
Office Action dated Aug. 27, 2010 in U.S. Appl. No. 11/209,962.
Office Action dated Feb. 1, 2011 in U.S. Appl. No. 11/209,962.
Office Action dated Oct. 1, 2009 in U.S. Appl. No. 11/227,660.
Office Action dated Jan. 27, 2010 in U.S. Appl. No. 11/227,660.
Office Action dated Oct. 7, 2010 in U.S. Appl. No. 11/227,660.
Office Action dated Jan. 25, 2011 in U.S. Appl. No. 11/227,660.
Office Action dated Mar. 30, 2009 in U.S. Appl. No. 11/346,522.
Office Action dated Jun. 17, 2009 in U.S. Appl. No. 11/346,522.
Office Action dated Oct. 7, 2009 in U.S. Appl. No. 11/683,824.
Office Action dated Mar. 15, 2010 in U.S. Appl. No. 11/683,824.
Office Action dated Jun. 28, 2010 in U.S. Appl. No. 11/683,824.
Office Action dated Nov. 19, 2010 in U.S. Appl. No. 11/683,824.
Office Action dated Nov. 10, 2010 in U.S. Appl. No. 11/996,615.
Office Action dated Apr. 6, 2011 in U.S. Appl. No. 11/996,615.
Office Action dated Nov. 9, 2010 in U.S. Appl. No. 12/638,717.
Office Action dated Feb. 11, 2011 in U.S. Appl. No. 12/638,717.
Office Action dated Mar. 11, 2011 in U.S. Appl. No. 12/903,962.
Office Action dated Mar. 11, 2011 in U.S. Appl. No. 12/903,967.
Office Action dated Mar. 11, 2011 in U.S. Appl. No. 12/903,970.
Office Action dated Mar. 11, 2011 in U.S. Appl. No. 12/903,974.
Office Action dated Mar. 11, 2011 in U.S. Appl. No. 12/903,981.
Official Action dated Mar. 28, 2011 in U.S. Appl. No. 12/389,213.
Official Action dated Mar. 15, 2010, U.S. Appl. No. 11/683,824, 10 pgs.
Official Action issued in Applicants' counterpart Chinese Patent Application Serial No. 200680003905.8 dated Jun. 12, 2009.
Official Action issued in Applicants' counterpart European Patent Application Serial No. 05 793 918.3-1213 dated Jan. 19, 2010.
Official Action issued in Applicants' counterpart European Patent Application Serial No. 06 788 685.3-1213 dated Oct. 16, 2009.
Official Action issued in Applicants' counterpart European Patent Application Serial No. 07 758 183.3 dated Jun. 22, 2010.
Official Action issued in Applicants' counterpart European Patent Application Serial No. 07864483.8 dated Jan. 7, 2011.
Official Action issued in Applicants' counterpart Russian Patent Application Serial No. 2008139902 dated Nov. 19, 2010.

Official Action received in Applicants' related Australian Patent Application Serial No. 2005290082 dated Apr. 20, 2007.
Official Action received in Applicants' related Australian Patent Application Serial No. 2005290082 dated Mar. 5, 2010.
Official Action received in Applicants' related Australian Patent Application Serial No. 2005290082 dated Apr. 13, 2010.
Official Action received in Applicants' related Australian Patent Application Serial No. 2005290082 dated May 20, 2010.
Official Action received in Applicants' related Australian Patent Application Serial No. 2005290082 dated Jul. 22, 2010.
Official Action received in related Australian Patent Application Serial No. 2006210619 dated Mar. 1, 2010.
Official Action received in Applicants' related Australian Patent Application Serial No. 2007233275 dated Jan. 14, 2011.
Official Action received in Applicants' related Australian Patent Application Serial No. 2007303240 dated Feb. 9, 2011.
Official Action received in Applicants' related New Zealand Patent Application Serial No. 575870 dated Mar. 17, 2011 and Nov. 11, 2010.
Resume of David Keith, Academic CV, Spring 2005, 8 pgs.
Rickman, "Imagine No Restriction on Fossil-Fuel Usage and No Global Warming!", found at http://www.lanl.gov/news/releases/archive/02-028.shtml.
Russian Official Action + Translation, dated Feb. 2, 2006, Appln. No. 2007132880/15 (035886).
Russian Official Action + Translation, dated Sep. 15, 2010 Appln. No. 2007132880/15 (035886).
Singer, Fred S., "Americans Believe in Global Warming . . . and Psychic Powers, Astrology, and UFO's", found at http://heartland.org/.
Snowpure, LLC, SnowPure Excellion Product Information and Brochure, Aug. 2009.
Toshikatsu, Yukio Mizutani, "Modification of Properties of Ion Exchange Membranes. VII. Relative Transport Number between Various Cations of Cation Exchange Membrane Having Cationic Polyelectrolyte Layer and Mechanism of Selective Permeation of Particular Cations", 1979, pp. 2071-2085.
Yin, et al., "Absorption and steam desorption performance of weak base anion exchange resin" (1995) Hangtian Yixue Yu Yixue Gongcheng/Space Medicine and Medical Engineering, 8 (1), pp. 27-31. (Abstract only).
European Official Action, Serial No. 06 788 68.3-1213, dated Oct. 12, 2011 (3 pages).
Mexican Official Action, Serial No. MX/a/2009/003500, dated Oct. 12, 2011 (6 pages).
Mexican Official Action, Serial No. MX/a/2007/002019, dated Aug. 31, 2011 (Mexico Attorney notified Attorney of record in instant application on Sep. 22, 2011) (2 pages).
Russian Official Action, Serial No. 2008139902/15, dated Jul. 20, 2011 (Russian Attorney notified Attorney of record in instant application on Sep. 15, 2011) (6 pages).
Russian Official Action, Serial No. 200914222/05, dated Sep. 30, 2011 (9 pages).
US Official Action, U.S. Appl. No. 12/274,986, dated Nov. 3, 2011 (36 pages).
US Official Action, U.S. Appl. No. 13/208,156, dated Oct. 26, 2011 (21 pages).
US Official Action, U.S. Appl. No. 11/209,962, dated Oct. 6, 2011 (24 pages).
US Official Action, U.S. Appl. No. 12/615,971, dated Sep. 29, 2011 (33 pages).
US Official Action, U.S. Appl. No. 13/102,915, dated Sep. 27, 2011 (10 pages).
US Official Action, U.S. Appl. No. 12/389,213, dated Sep. 27, 2011 (27 pages).
US Notice of Allowance, U.S. Appl. No. 12/265,556, dated Nov. 7, 2011 (33 pages).

* cited by examiner

REMOVAL OF CARBON DIOXIDE FROM AIR

CROSS REFERENCE TO RELATED APPLICATIONS

The present application claims priority from U.S. Provisional Application Ser. No. 60/985,586, filed Nov. 5, 2007; the contents of which are incorporated herein by reference.

FIELD OF THE INVENTION

The present invention relates to removal of selected gases from air. The invention has particular utility for the extraction of carbon dioxide ($CO_2$) from air and will be described in connection with such utilities, although other utilities are contemplated.

BACKGROUND OF THE INVENTION

There is compelling evidence to suggest that there is a strong correlation between the sharply increasing levels of atmospheric $CO_2$ with a commensurate increase in global surface temperatures. This effect is commonly known as Global Warming. Of the various sources of the $CO_2$ emissions, there are a vast number of small, widely distributed emitters that are impractical to mitigate at the source. Additionally, large scale emitters such as hydrocarbon-fueled power plants are not fully protected from exhausting $CO_2$ into the atmosphere. Combined, these major sources, as well as others, have led to the creation of a sharply increasing rate of atmospheric $CO_2$ concentration. Until all emitters are corrected at their source, other technologies are required to capture the increasing, albeit relatively low, background levels of atmospheric $CO_2$. Efforts are underway to augment existing emissions reducing technologies as well as the development of new and novel techniques for the direct capture of ambient $CO_2$. These efforts require methodologies to manage the resulting concentrated waste streams of $CO_2$ in such a manner as to prevent its reintroduction to the atmosphere.

The production of $CO_2$ occurs in a variety of industrial applications such as the generation of electricity power plants from coal and in the use of hydrocarbons that are typically the main components of fuels that are combusted in combustion devices, such as engines. Exhaust gas discharged from such combustion devices contains $CO_2$ gas, which at present is simply released to the atmosphere. However, as greenhouse gas concerns mount, $CO_2$ emissions from all sources will have to be curtailed. For mobile sources the best option is likely to be the collection of $CO_2$ directly from the air rather than from the mobile combustion device in a car or an airplane. The advantage of removing $CO_2$ from air is that it eliminates the need for storing $CO_2$ on the mobile device.

Extracting carbon dioxide ($CO_2$) from ambient air would make it possible to use carbon-based fuels and deal with the associated greenhouse gas emissions after the fact. Since $CO_2$ is neither poisonous nor harmful in parts per million quantities, but creates environmental problems simply by accumulating in the atmosphere, it is possible to remove $CO_2$ from air in order to compensate for equally sized emissions elsewhere and at different times.

The art has proposed various schemes for removal of $CO_2$ from combustion exhaust gases or directly from the air by subjecting the gases or air to a pressure swing or a thermal swing using a $CO_2$ adsorbent. These processes use pressure or temperature changes, respectively, to change the state of the sorbent material, whereby to release the $CO_2$. Different sorbent materials are disclosed, including zeolites, amines, and activated alumina. See, for example, U.S. Pat. No. 4,711,645; U.S. Pat. No. 5,318,758; U.S. Pat. No. 5,914,455; U.S. Pat. No. 5,980,611; U.S. Pat. No. 6,117,404; and co-pending U.S. application Ser. No. 11/683,824, the contents of which are incorporated herein by reference.

None of these references, however, provides a particularly efficient process for the removal of $CO_2$, primarily due to the amount of energy expended in $CO_2$ recovery and sorbent regeneration.

SUMMARY OF THE INVENTION

The present invention provides improvements over the prior art as described above. More particularly, the present invention provides a method and apparatus for removing a contaminant from a gas stream by utilizing a sorbent that captures the contaminant, such as carbon dioxide (CO2) when it is sufficiently dry and releases the contaminant to a contained atmosphere when the sorbent is exposed to water or humidity. In an alternative embodiment, the sorbent may be regenerated by being placed in a regeneration unit maintained at a temperature higher than that of the gas stream and wherein the heat retained by the sorbent after regeneration is conserved by passing the sorbent through a heat exchanger. Finally, a combination of the humidity and thermal swings may be used to optimize the sorbent regeneration.

To conserve energy, the present invention may employ a heat exchanger using water as a refrigerant, wherein the water is evaporated in an evacuated space to draw heat from the regenerated sorbent and the water is then condensed on the sorbent loaded with the contaminant. The use of other fluids as refrigerants is also contemplated. Alternatively, the refrigerant may be isolated from the sorbent so as not to interfere with the thermal function of the sorbent.

In one aspect, the present invention provides a method for removing carbon dioxide from a gas stream by placing said gas stream in contact with a substrate having a surface in which cations are embedded and releasing the carbon dioxide from said substrate by use of a humidity swing. Anions that are individually mobile are initially included on the surface, wherein carbon dioxide from said gas stream becomes attached to the substrate by reacting with said anions. In a further embodiment, the carbon dioxide is captured by reacting with said anions to form bicarbonate.

In another aspect, the present invention provides a method for removing carbon dioxide from humid air, comprising placing the humid air in contact with a material having a surface on which hydroxide ions form, wherein carbon dioxide from the humid air becomes attached to the surface of the material by reacting with the hydroxide ions; and applying a bias voltage to the material which releases the hydroxide ions and the carbon dioxide.

In yet another aspect, the present invention provides a method for extracting a contaminant from a gas stream, comprising the steps of:

a) bringing the gas stream in contact with a sorbent which captures the contaminant from the gas stream, so as to at least partially saturate the sorbent with contaminant;

b) placing the contaminant carrying sorbent in a regeneration unit for releasing the contaminant from the sorbent and regenerate the sorbent, wherein the regeneration unit is maintained at a temperature that is higher than the temperature of the gas stream; and c) removing the regenerated sorbent from the regeneration unit; and d) capturing heat from the regenerated sorbent as the sorbent is removed from the regeneration unit.

Finally, the present invention in another aspect provides an apparatus for extracting a contaminant from a gas stream using a sorbent employing a thermal swing, comprising: a sorbent for capturing the contaminant; a capture unit, wherein the sorbent is exposed to the gas stream and becomes at least partially saturated with the contaminant; a regeneration unit, wherein the sorbent is exposed to elevated temperatures thereby causing the sorbent to release the contaminant according to a thermal swing; and a heat exchanger for extracting heat retained from the sorbent in the regeneration unit.

BRIEF DESCRIPTION OF THE DRAWINGS

Further features and advantages of the present invention will be seen from the following detailed description, taken in conjunction with the accompanying drawings, wherein.

DETAILED DESCRIPTION OF PREFERRED EMBODIMENTS

The present invention provides a method and apparatus for the extraction of a contaminant from a gas stream. The present invention is discussed in reference to a method and apparatus for capturing $CO_2$ from ambient air, but the technology is also applicable to exhaust air or other gas streams and may be used to capture hydrogen sulfide, ammonia, or other common contaminants from such gas streams.

In co-pending patent application Ser. No. PCT/US07/84880, assigned to a common assignee and incorporated by reference herein, we discuss a $CO_2$ capture process that utilizes a humidity swing to regenerate a sorbent, releasing a mixture of $CO_2$ and water vapor. The water vapor may be removed from the mixture by compression or cooling, either of which will cause the water vapor to condense and precipitate out of the mixture.

Figure 1:
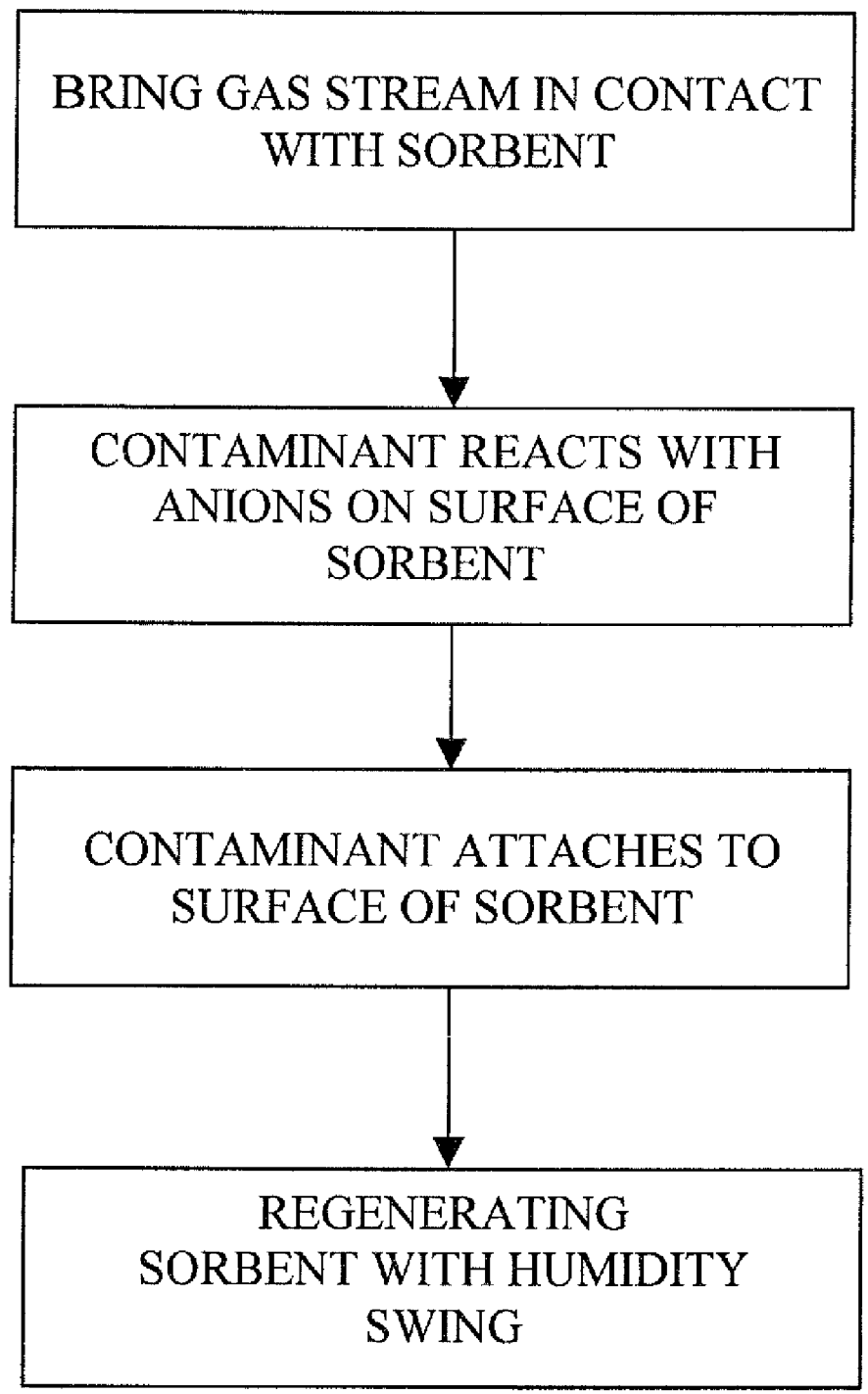
FIG. 1 is a flowchart showing a method for removing a contaminant from a gas stream according to one aspect of the present invention.

A first aspect of the present invention provides an improved substrate that can hold cations embedded into its surface, thereby facilitating the capture and release of carbon dioxide using a humidity swing. See FIG. 1. For a solid substrate to efficiently absorb $CO_2$, it must have a large surface area exposed to the gas stream and it needs to be able to temporarily hold on to $CO_2$ molecules by some mechanism. The mechanism used by the present invention is based on the binding energy between positive ions and negative ions and on the interplay between carbonate ions and bicarbonate ions. A matrix loaded with attached positive ions will hold on to negative ions even if the negative ions are individually mobile. In contrast to the positive ions, the negative ions are mobile in water. As these ions "dissolve" into the water, their dynamics will be similar to those of the same ions in a dissolved salt. However, the positive charge on the substrate must be neutralized by some negative ions.

The initial preparation of a substrate could use any negative ion to satisfy charge balance, but according to the present invention, it is useful to replace these negative ions with hydroxide ions. This is difficult for two reasons. One is that the substrate itself could be destroyed by hydroxide solutions; e.g., it may dissolve or chemically react with hydroxides. The second reason is that the hydroxide ion, once attached, is unstable in a dry environment. In that case, two hydroxide ions would react to form water and an oxide ion. This outcome becomes more likely where the positive ions are closely spaced. If they are sufficiently far apart this outcome is less likely.

Hydroxide ions attached to the surface can react with $CO_2$ to form bicarbonate ions. Two bicarbonate ions could then react to form water, $CO_2$, and a carbonate ion. In that case, energetics likely would favor the formation of carbonate over bicarbonate. Thus $CO_2$ loading would be limited to what can be achieved with carbonate. To optimize this process, the energetics has to be such that on a dry surface bicarbonates are favored over carbonates. Furthermore, the cations must not leach out in the presence of water. The energetic difference between carbonate and bicarbonate at this point can be engineered to control the balance between the two options. By optimizing the energy difference we can assure that a large change in loading of the substrate between carbonate loading (50% of maximum) to bicarbonate loading (100% of maximum) happens in partial pressures of $CO_2$ that are near those of ambient air.

When exposed to water, the above-described material will convert bicarbonate ions in water into carbonate ions, water, and carbon dioxide. Thus, when wetted, the material will release a large amount of carbon dioxide.

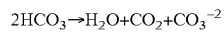

$$2HCO_3 \rightarrow H_2O + CO_2 + CO_3^{-2}$$

The water carrying capacity of the substrate should be minimized, limiting the amount of water that needs to be removed before the surface can once again pick up $CO_2$. However, the substrate material should be highly porous to maximize the surface area. Further, the surface should be covered with ions that attract polar molecules, such as water molecules. Since these last two features may conflict with the need to limit water carrying capacity, optimization is required.

A water swing will work with any substrate that has the properties laid out above. In the presence of water the ions that are dissolved into the water will achieve an equilibrium state that is similar to what one would expect in an aqueous solution that is in equilibrium with an atmosphere having a specific partial pressure of $CO_2$. In the absence of the water the energetic state of the carbonate ion is disfavored and thus the loading with $CO_2$ in the form of bicarbonate can increase. This is the case in conventional strong base quaternary amine resins and it appears to be true for all structures comprising ions fixed to a surface. By understanding the underlying mechanism we can define a whole family of substrates that can collect $CO_2$ from the air and release it via a humidity swing.

Preventing the formation of carbonate ions in favor of bicarbonate ions can be achieved by spacing the cations embedded in the substrate sufficiently far apart so that a single doubly charged ion such as $CO_3^{-2}$ does not cover two positive ions. Other configurations also may be feasible. In the dry state the cations may be neutralized by hydroxide ions. If the system in this form is not stabilized, however, the hydroxides would convert to oxides, and water would be released. In such a system, water would compete with $CO_2$ for the uptake on the surface.

Strong base quaternary resins such as Marathon A satisfy the above criteria. However, there are other substrates that could support such cations and have properties that are more efficient for the purpose of this invention. For example, one class of ionic substrates that meet these requirements are materials produced by ion implantations into material surfaces, where these ions have to be sputtered on. This introduces a wide class of materials that otherwise would be inaccessible for functionalizing the surface.

Other methods could include functionalization of minerals, or other inorganic materials where defects can be accommodated in the surface and made to be stable even in the presence of water. What is important is that the material formed is stabilized against the formation of carbonates and oxides. Presumably, the same spacing argument would make it possible to avoid the formation of an oxide that could negate two charges.

The two reactions that must be suppressed are:

$$2OH^- \rightarrow H_2O + O^{-2}$$

and $$2HCO_3^- \rightarrow H_2O + CO_2 + CO_3^{-2}$$

In both cases this can be achieved by spacing the ions far enough apart for the bivalent negative ions to be unstable in the presence of two single positive charges.

Zeolites are another class of materials that meet the aforesaid criteria. While there already is some binding of $CO_2$ and $H_2O$ to the surface, which may complicate matters, zeolites provide lots of surface area, another important factor.

Non-electroactive materials to which positive ions can be added also meet the aforesaid criteria of the present invention. Positive ions may also be substituted by introducing negative defects; i.e., a missing negative ion could act, in effect, like a net positive ion. Electroactive materials would screen out fixed charges. It is important that the positive net charge is fixed onto the substrate and cannot be dissolved away in the presence of water.

In a preferred embodiment, the present invention provides a strong-base resin in which hydroxide ions are gradually replaced with inorganic carbon ions. The stoichiometry is such that the final state tends to be a bicarbonate rather than a carbonate as there is essentially one positive charge per $CO_2$ molecule absorbed. The resin is hygroscopic, but more importantly the $CO_2$ partial pressure over the resin is not only a function of the $CO_2$ loading of the resin, but also a function of the water vapor in the gas. The response to changes in the humidity in the gas is very fast. The relevant factor appears to be the $CO_2$ vapor concentration in the air. In setting the equilibrium partial pressure of $CO_2$ over the system, however, the water loading of the resin is also a factor. Results indicate that the dependence on water vapor is driven more by absolute humidity than by relative humidity. Thus the system works equally well in hot dry climates and cool humid climates, as both will have a similar dew point temperature.

The advantage of the resin of the present invention over the ordinary metal oxides of the prior art is twofold: first it binds $CO_2$ more weakly than a typical metal oxide or hydroxide would; second it presents an unusually large amount of surface for absorption of $CO_2$. The loading can reach a concentration of nearly two mole of $CO_2$ per liter.

Rather than washing the resin in sodium hydroxide, we use sodium carbonate solutions to wash $CO_2$ off the resin. We have shown that this leads to a resin saturation with $CO_2$ of one carbon ion per two positive charges. Hence the resin in this state resembles a carbonate rather than a bicarbonate. A fully saturated sorbent, however, can drive the resulting carbonate/bicarbonate mixture to become almost entirely composed of bicarbonate. This is possible due to the amount of surface area available.

Another advantage of the resin is that the spacing between positive charges is optimized to discourage the deposition of carbonate ions on the resin in favor of bicarbonate ions. It appears that the resin can reach a state where it binds one carbon ion for every positive charge on the resin and it reaches this state at ambient conditions. Furthermore, there is no break in the reaction kinetics as the resin moves from a composition with less than one carbon ion per 2 positive charges to more than one carbon ion per 2 positive charges. This is possible because the distance between two positive charges is too large to be covered by one doubly charged carbonate ion. Instead the carbonate appears to split one water molecule and transforms into a bicarbonate ion and a hydroxide ion. The two ions independently neutralize each charge. When water is present, the large hydration cloud of the carbonate ion discourages this reaction. Thus as the water on the surface is removed, it leaves behind a system that absorbs additional bicarbonate from the air, as it exposes more hydroxide ions.

The equilibrium state of the resin is dramatically affected by the water vapor content of the air. For dry air the loading is far higher than it is for humid air. This forms the basis for the water vapor swing of the present invention.

For a sorbent to perform as described above, the sorbent should comprise positive ions embedded into the sorbent matrix in a way that allows the matrix to attract negative ions like $OH^-$, $Cl^-$, $CO_3^=$, and $HCO_3^-$. It is important for the positive charges to be substantially immobile. Also, the spacing between positive ions has to be such that a bicarbonate form is favored over that of carbonate. For a surface with little moisture residue, the carbonate ions will lack most of their hydration cloud and thus they are less stable than they would be in a dilute brine. As discussed above, it is believed that a water molecule is split by the $CO_3^=$ to form a $HCO_3^-$ and an $OH^-$. These two ions will then bind to the positive sites. In such a system the $CO_2$ uptake capacity is maintained even if stoichiometrically there is one carbonate for every two positive ions. The hydroxide is preformed and then absorbs a second $CO_2$ to form a second bicarbonate. It is possible that other mechanisms may be in play. Nevertheless the essential feature that the bicarbonate is stabilized in favor of the carbonate is undoubtedly correct. It is also clear that the bicarbonate is favored if the distance between the sites gets too large.

There are several strategies to improve this sorbent. The first category is to optimize the spacing of positive ions and other critical parameters in the current resin. The second category of improvements is to find a different material. One example is highly porous, high surface area (activated) metal oxides and metal hydroxides that could lend themselves to the same treatment as the resin. In particular, we are interested in oxides that are already partially carbonated and whether or not we can drive them to bicarbonate. High surface powders formed from $Na_2CO_3$, $Al(OH)_3$, $Mg(OH)_2$, $Fe_2O_3$ are a few examples. More specific examples include activated alumina, activated magnesia, and activated iron oxides.

Figure 2:
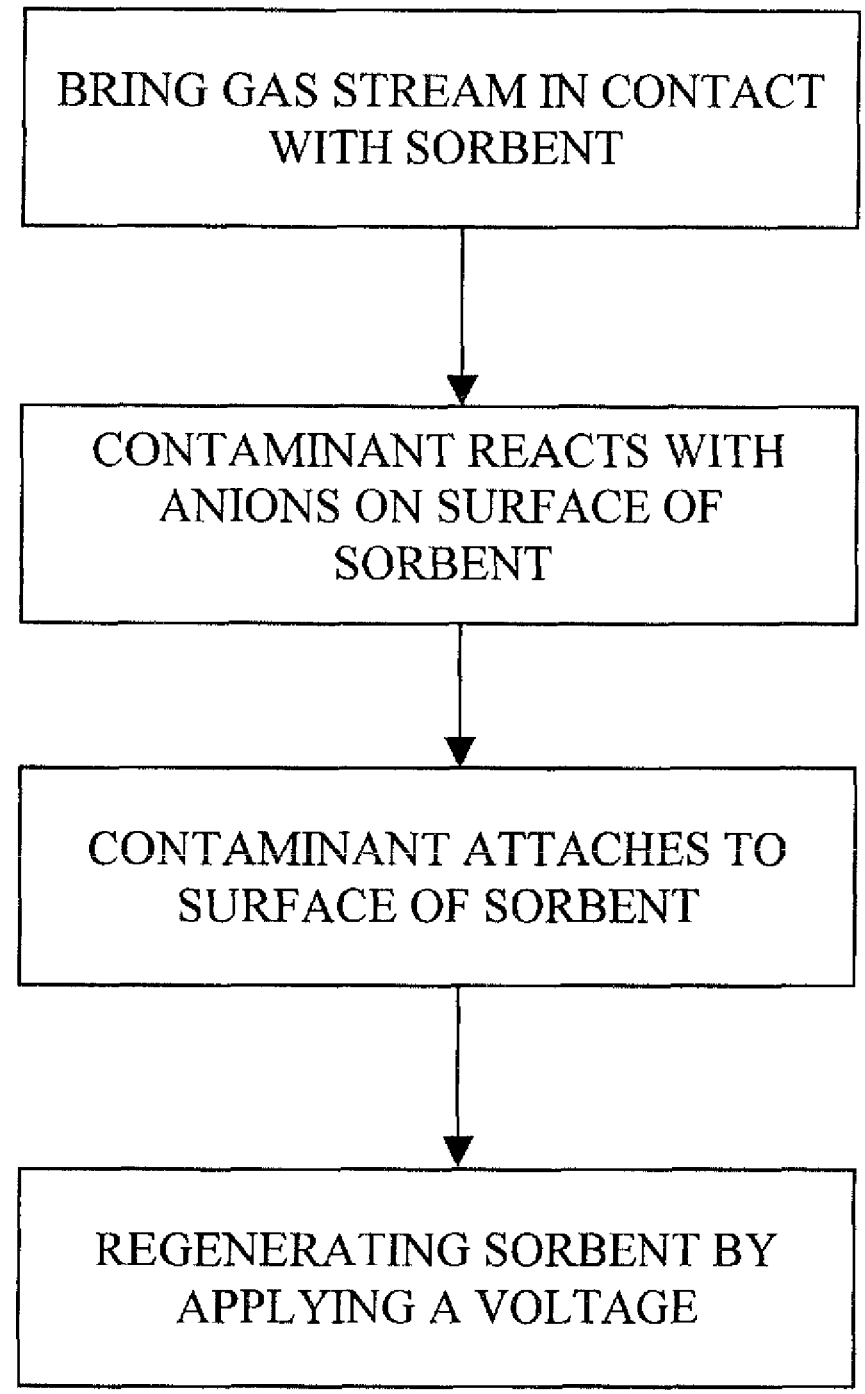
FIG. 2 is a flowchart showing a method for removing a contaminant from a gas stream according to a second aspect of the present invention.

An alternative embodiment comprises a metal that forms hydroxides in the presence of humid air. See FIG. 2. In this situation we can consider the metal surface as an electrode that can be biased in voltage relative to the air. The hydroxylation reaction in the presence of an electric voltage is reversible. That is to say, it should be possible to reduce the metal on its surface and free water and oxygen according to the reaction:

$$2M^{++}(OH^-)_2 \Leftrightarrow 2M+4e^-+2H_2O+O_2,$$

By reversing the voltage, it is possible to reverse the reaction and form a hydroxide layer again. The reaction can be driven forward and back by changing the applied bias voltage. The hydroxide once formed could then be transformed into either a carbonate or a bicarbonate in the presence of $CO_2$. Whereas the bias voltage would destroy the hydroxide, the carbonate is unstable under voltage change and would thus come off. Thus, it is possible to drive off the $CO_2$ by a voltage switch. This switch would also produce water and oxygen from 4 hydroxide ions, but the energy expended here can be recovered in the immediate reversal, which will also recover the hydroxide.

This system may be viewed as analogous to a capacitor that is charged up; a chemical storage capacitance. The reversal of the voltage will recover most of the energy that was put into the system in the forward swing. Thus, we will look for low frequency oscillations (tied to the RC value of the circuit) that would allow us to drive $CO_2$ off the membrane. It is possible to clean the $CO_2$ off in a single swing but it may take more than one cycle. It is also possible to recover the $CO_2$ from the gas stream, while the water and oxygen have been retained within the system. This may be accomplished by having humid oxygen, water mixtures flow through the system, carrying $CO_2$ out of the system as it is freed from the surfaces. Since there is water and oxygen in the input stream, the reverse reaction will occur unimpeded, while the $CO_2$ is carried away by the gas stream.

The affinity of bicarbonate and carbonate to this surface will depend on the bias voltage applied. Thus we can tailor the binding strength of the sorbent with a bias voltage that is chosen for optimal conditions. It is then possible to change the equilibrium partial pressure of $CO_2$ simply by changing the bias voltage in a regime where no oxygen is formed. This would provide another mechanism for recovering $CO_2$. In this regime the voltage switch is insufficient to drive the hydroxide off, but it is sufficient to change the $CO_2$ partial pressure.

If the voltage is switched back and forth very rapidly then the energy expended in producing oxygen will be returned immediately in recovering the hydroxide. It is well known that the $CO_2$ uptake rate is slow, so once the $CO_2$ has been forced off, the $CO_2$ may be recovered before it has a chance to be returned to the matrix. The metal sponge would make it possible to create a large amount of surface and control the chemical behavior with a bias voltage. The bias voltage may be manipulated to assure that electric contact to all parts of the electrode material is maintained. It will be necessary to manage hydroxide formation, however, as the presence of too much hydroxide could inhibit conductivity.

It may be more favorable in terms of energy expended to operate between carbonate and bicarbonate rather than between carbonate and hydroxide. On the other hand, by using a voltage bias that will keep the hydroxide layer intact or a material where the spacing between the positive charges is such that the formation of carbonates is energetically suppressed will result in an apparatus that operates between hydroxide and bicarbonate, without the production of carbonate as an intermediary. This would likely require materials with a larger than normal spacing between positive charges. This spacing is larger than is typically feasible with simple hydroxide crystals. There are several ways to produce such materials. One would be to embed the positive ions in a noble or semi-noble metal, such as tin-copper, aluminum-copper, magnesium-aluminum, magnesium-copper or iron-copper alloys. Also useful are alloys with elements that prefer to go to an oxidation state of 1, e.g., sodium, potassium, Li alloys with copper or other more noble elements including silver. It could also be carbon matrix that is used to separate the fixed positive ions from each other. This strategy could lead to ion-implantation, perhaps by particle beams into activated carbon surfaces or other metallic surfaces.

Another alternative embodiment would use a semiconductor, e.g., phosphor doped Si. The phosphor atoms will act as positive charges embedded into a neutral matrix. The phosphor atoms, will attract hydroxides if the bias voltage is sufficiently positive, and thus could act as spaced hydroxides. Again, by changing the bias voltage it becomes possible to first manipulate the equilibrium partial pressure of $CO_2$ over a partially loaded surface, and in the extreme of driving off the hydroxide remove virtually all $CO_2$ from the surface.

These hydroxides in turn bind carbonates or bicarbonates. These materials may be optimized to create just the right binding energy. Ideally we eliminate the binding of carbonate, so that the dominant binding is to bicarbonate ions. By creating a nanoporous material we can create large numbers of binding sites. Then, by swinging the voltage we can bias the binding energy of the $CO_2$ and thus drive $CO_2$ from the substrate. We may also drive the voltage so high that the water will come off as well. This requires a fast swing, so that the energy of the oxygen formation is recovered immediately in the swing back to hydroxide.

Further embodiments are also possible without departing from the spirit and scope of the invention as described above. For example, an improved substrate may be composed of or include: sodium silicates, wherein hydrophobic resins with embedded ions are used; activated alumina; foam materials including aerogels; functionalized aquafoams or other foams; or large complex cations such as copper complexes. In addition, the substrate may be modified by using different bonding agents or by reshaping the resin.

Figure 3:
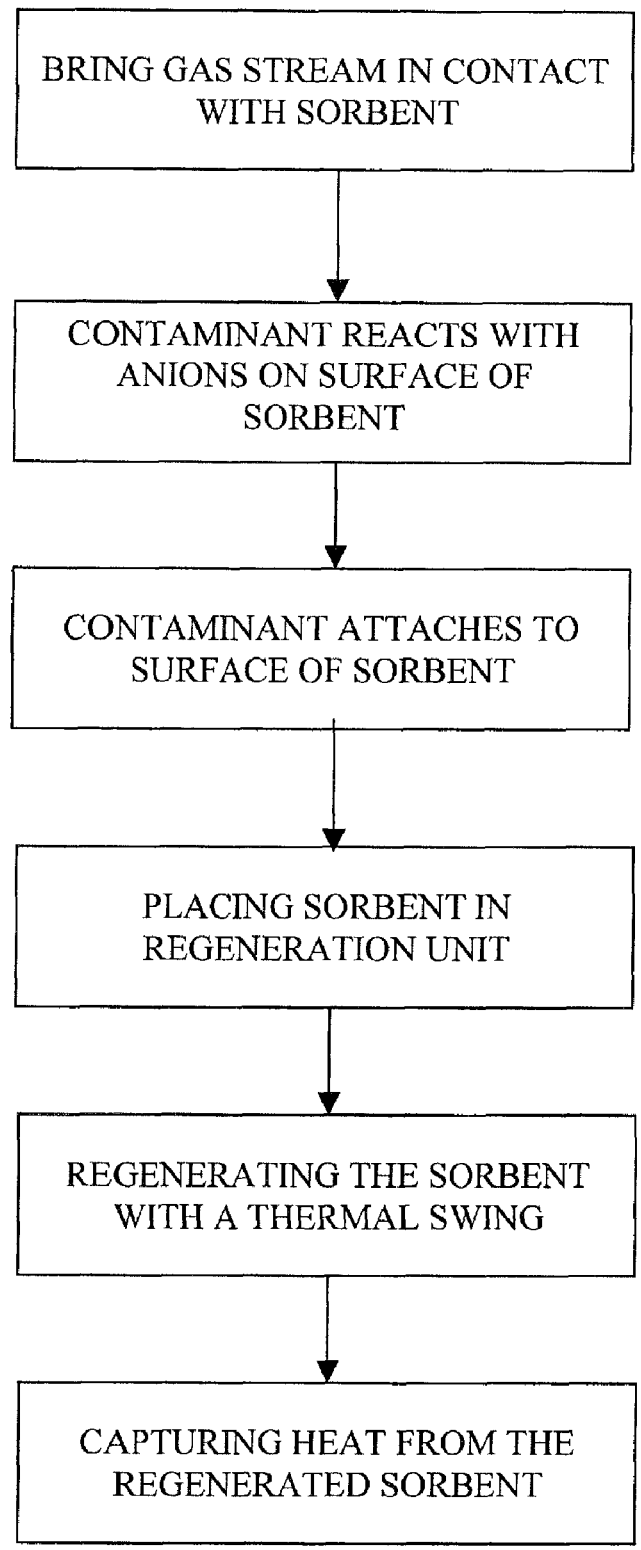
FIG. 3 is a flowchart showing a method for removing a contaminant from a gas stream according to a third aspect of the present invention.

In another aspect of the present invention, a heat exchanger is used to further improve the embodiments outlined above. See FIG. 3. To perform the humidity swing, it is useful to expose the sorbent to low pressure water vapor. In order to achieve the required minimum water vapor pressure, it is may be necessary to operate above ambient temperatures as the maximum water vapor pressure depends strongly on the temperature. To that end, the aforementioned co-pending applications discuss how to transfer heat to loaded sorbents that need to be inserted into an environment that is at a higher temperature.

Where compression is used to condense the water out of the resulting gas mixture, the heat produced by that process can be transferred to the sorbent to raise its temperature as required. Alternatively, the heat required to drive the sorbent to the requisite temperature also can be derived from the condensation of water that has been allowed to evaporate at ambient conditions. The present invention employs heat transfer methods increase the efficiency of the capture process.

Figure 4:
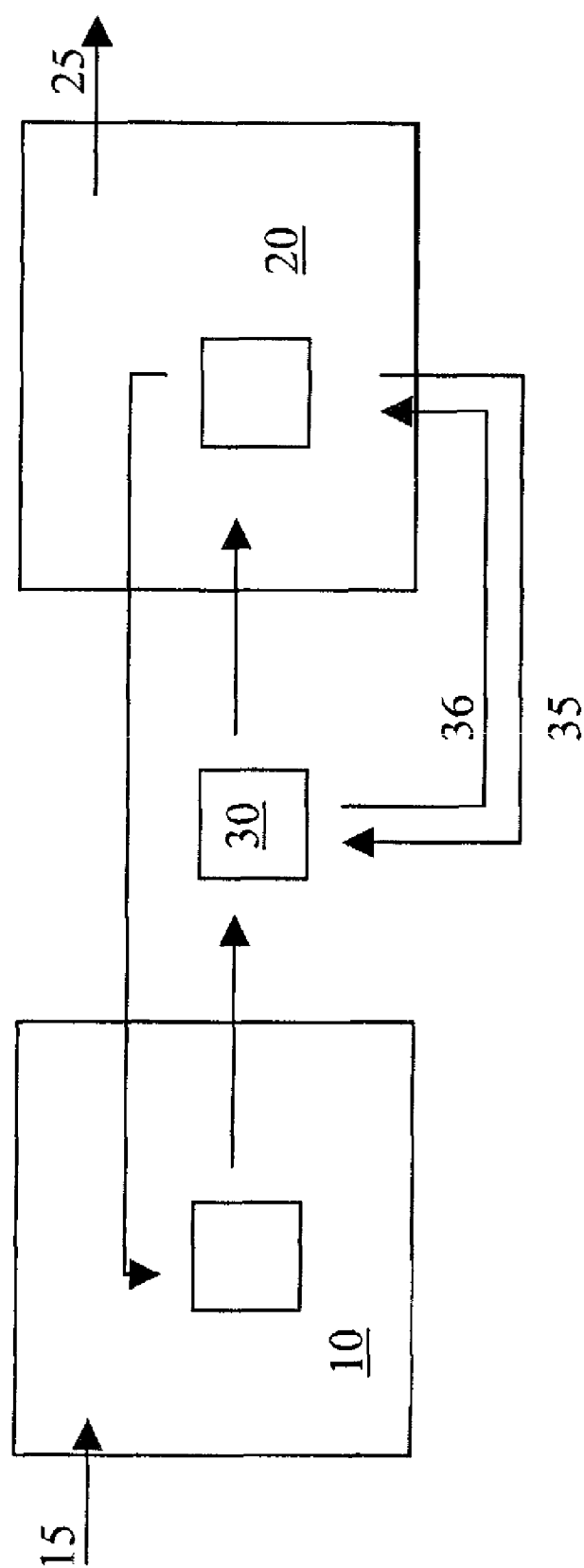
FIG. 4 is a schematic of an apparatus for removing a contaminant from a gas stream according to the method shown in FIG. 3.

Referring to FIG. 4, the process employs an apparatus including a capture unit 10 and a regeneration unit 20, having a sorbent material 30 that can be moved from one unit to the other. The gas stream 15 enters the capture unit 10 and the contaminant (in this instance, CO2) is captured by the sorbent 30. The sorbent is then transferred to the regeneration unit 20, where the contaminant is released in off stream 25. This process is aided by using water as a means for transferring heat from the regenerated sorbent to the loaded sorbent.

For the purposes of this aspect of the present invention, the sorbent material may be a liquid that can absorb $CO_2$, such as for example, a sodium hydroxide solution, a sodium carbonate solution, or an amine solution; or may be a solid, such as for example, solid amine resins or other ion exchange resins.

In a primary embodiment, the capture unit is open to ambient air. The regeneration unit is assumed to be at a temperature $T_1$, where $T_1$ is greater than $T_a$, wherein $T_a$ is the ambient air temperature. For example, $T_1$ preferably is at least 20° C. above $T_a$. The sorbent material in the capture unit must be brought into the regeneration unit to release the $CO_2$. The regeneration unit raises the temperature of the sorbent to release the $CO_2$. Then the sorbent material is returned to the capture unit. This thermal swing may be, for example, a rise of up to about 100° C. above ambient temperatures. The heat required to maintain the regeneration unit at temperature $T_1$ may be supplied by a heat reservoir 40, such as the ground or a water reservoir, or may be provided from other sources, including but not limited to solar energy, geothermal energy, or waste heat from other processes such as for example power plants, steel mills, cement plants.

Referring again to FIG. 4, the water absorbs heat from the regenerated sorbent and is evaporated, the evaporated water is transferred to the loaded sorbent along path 35, where it condenses. The condensed water is then returned to the regeneration unit along path 36. In order to avoid any unnecessary losses, heat from the sorbent can be returned to the regeneration unit before the sorbent is again exposed to ambient air, thus conserving energy. This may be done, for example, by evaporating water into an evacuated space. The water vapor contains the latent heat of evaporation, and if the water is compressed at a higher temperature it will release its heat content at the higher temperature. One way to bring about this transition is to let the water condense onto the surfaces of the sorbent. This may be counter-productive in some instances, however, as the presence of water may interfere with the $CO_2$ release of some sorbents.

For sorbents where contact with water is unacceptable, there may be other working fluids that could be deployed in a similar manner. In such case, it is important that the working fluid itself does not interfere with the release of $CO_2$ from the sorbent, and that it can readily be separated from the released $CO_2$. Water is a good choice for most sorbents because the water will condense out under compression and thus is easily separated from $CO_2$. $CO_2$ as a working fluid would not require a separation from the product $CO_2$, but it would of course interfere to some extent with the process of releasing $CO_2$ from the sorbent. Nevertheless, it is possible to remove the bulk of the compressed $CO_2$ at high pressure, and reduce the volume of residual $CO_2$ so much that the subsequent expansion does not provide enough heat mass for the resulting temperature drop to effectively cool the chamber or the sorbent material inside of it.

Figure 5:
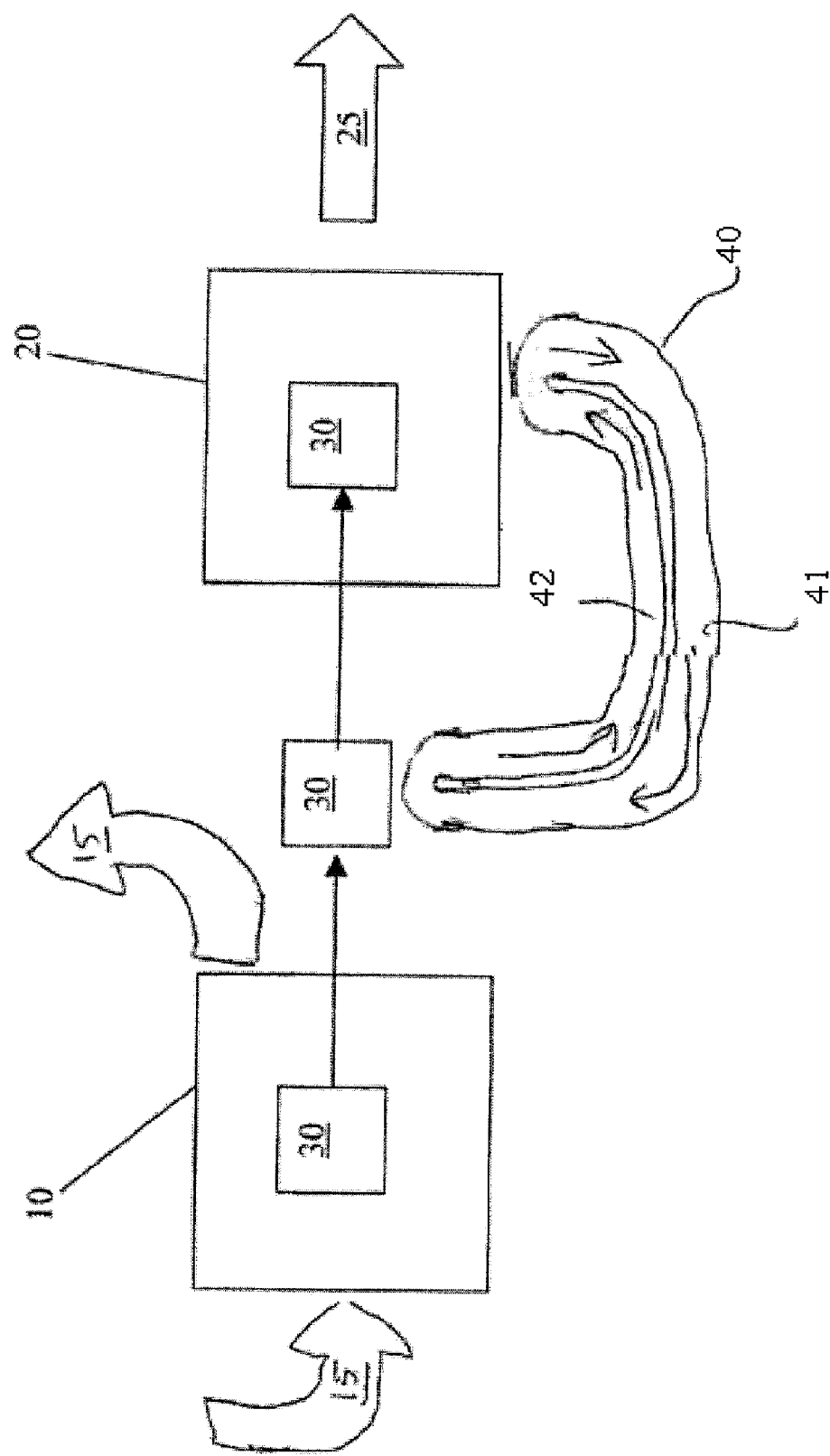
FIG. 5 is a schematic of an apparatus for removing a contaminant from a gas stream according to an alternative embodiment of the method shown in FIG. 3.

Referring to FIG. 5, it also is possible to isolate the working fluid from the sorbent 30 in a heat exchanger 40, in which case the working fluid may be used to transfer heat from the ambient conditions, or from the elevated temperature of the regeneration unit to the $CO_2$-loaded sorbent material that is about to enter the regeneration unit along path 41. It also is possible to effectuate some of the transition by transferring directly heat from warm regenerated sorbent down a natural temperature gradient to cold, $CO_2$-loaded sorbent. Further, where the working fluid is isolated from the sorbent 30, the choice of an optimal working fluid is not limited to water. It could, for example, be $CO_2$ which in near ambient conditions has been identified as a good choice of a refrigerant. Other refrigerants, such as R-12 or R-22, are also viable in this arrangement.

The present invention therefore provides a sorbent that absorbs a gas, such as $CO_2$, under controlled temperatures, and will load itself fully or partially with the gas it is absorbing. At the time the sorbent enters into the recycle loop we refer to it as the loaded sorbent, even if the loading does not reach the maximum level that is achievable. The sorbent is recovered at an elevated temperature, the goal of this invention being to provide the heat necessary to drive the sorbent to the higher temperature. It is implicitly assumed that the heat required to release the gas is also provided but that in the typical case this is small compared to the heat required to warm the sorbent. Whether or not this amount of heat can be considered small, in heating up the sorbent, it is understood that this heat is provided as well.

It should be emphasized that the above-described embodiments of the present device and process, particularly, and "preferred" embodiments, are merely possible examples of implementations and merely set forth for a clear understanding of the principles of the invention. Many different embodiments of the invention described herein may be designed and/or fabricated without departing from the spirit and scope of the invention. All these and other such modifications and variations are intended to be included herein within the scope of this disclosure and protected by the following claims. Therefore the scope of the invention is not intended to be limited except as indicated in the appended claims.

The invention claimed is:

1. A method for removing carbon dioxide from a gas stream, comprising
    placing said gas stream in contact with a substrate having a surface in which cations are physically embedded, wherein anions which are individually mobile are included on said surface, and wherein carbon dioxide from said gas stream becomes attached to said substrate by reacting with said anions; and
    releasing the carbon dioxide from said substrate to a contained environment by use of a humidity swing.

2. The method as recited in claim 1, wherein the cations that are embedded have a minimum spacing to prevent said anions from interacting with each other.

3. The method as recited in claim 1, wherein said anions are substrate is formed by ion implanting a cation material onto a neutral substrate material.

4. The method as recited in claim 3, wherein said cation material comprises a metal oxide or metal hydroxide.

5. The method as recited in claim 1, wherein said substrate is formed by sputtering an action material onto a neutral substrate material.

6. The method as recited in claim 1, wherein said substrate includes a zeolite material.

7. The method as recited in claim 1, wherein said substrate is formed of a non-electroactive material to which positive ions are added.

8. The method as recited in claim 1, wherein said substrate includes activated alumina as a material.

9. The method as recited in claim 1, wherein said substrate includes activated magnesia as a material.

10. The method as recited in claim 1, wherein said substrate includes activated iron oxide as a material.

11. A method of extracting $CO_2$ from a gas stream comprising exposing a sorbent to said gas stream so as to at least partially saturate said sorbent with $CO_2$, and releasing said captured $CO_2$ so as to regenerate said sorbent, wherein said sorbent comprises positive ions that are immobile and spaced such that carbonate ions are unstable in the presence of two single positive charges, and further wherein said sorbent is a metal oxide or metal hydroxide.

12. The method of claim 11, wherein said metal oxide or metal hydroxide is selected from the group consisting of: aluminum hydroxide, magnesium hydroxide, iron(III) oxide, activated alumina, activated magnesia, and activated iron oxides.

13. The method of claim 11, wherein said gas stream is ambient air.

14. A method of extracting $CO_2$ from a gas stream comprising exposing a sorbent to said gas stream so as to at least partially saturate said sorbent with $CO_2$, and releasing said captured $CO_2$ so as to regenerate said sorbent, wherein said sorbent comprises positive ions that are immobile and spaced such that carbonate ions are unstable in the presence of two single positive charges, and further wherein said sorbent is a zeolite.

15. The method of claim 14, wherein said gas stream is ambient air.

16. The method of claim 14, wherein said zeolite releases captured $CO_2$ when exposed to a thermal swing, a water swing, a humidity swing, a voltage swing, or a thermal swing and a humidity swing.

* * * * *

UNITED STATES PATENT AND TRADEMARK OFFICE
CERTIFICATE OF CORRECTION

PATENT NO. : 8,133,305 B2  
APPLICATION NO. : 12/265556  
DATED : March 13, 2012  
INVENTOR(S) : Lackner et al.

Page 1 of 1

It is certified that error appears in the above-identified patent and that said Letters Patent is hereby corrected as shown below:

In the claims at column 10, line 50, please delete "an action" and insert -- a cation --.

Signed and Sealed this  
First Day of May, 2012

David J. Kappos  
*Director of the United States Patent and Trademark Office*